(12) United States Patent
Noble

(10) Patent No.: US 9,922,135 B1
(45) Date of Patent: Mar. 20, 2018

(54) DISTRIBUTED STORAGE AND RETRIEVAL OF DIRECTED ACYCLIC GRAPHS

(71) Applicant: Amazon Technologies, Inc., Seattle, WA (US)

(72) Inventor: Matthew Roy Noble, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 636 days.

(21) Appl. No.: 14/104,487

(22) Filed: Dec. 12, 2013

(51) Int. Cl.
*G06F 17/30* (2006.01)

(52) U.S. Cl.
CPC .. *G06F 17/30958* (2013.01); *G06F 17/30598* (2013.01)

(58) Field of Classification Search
None
See application file for complete search history.

(56) References Cited

U.S. PATENT DOCUMENTS 6,988,183 B1* 1/2006 Wong ............... G06F 9/30174
712/208
2014/0358876 A1* 12/2014 Bhattacharjee ..... G06F 17/3023
707/695

OTHER PUBLICATIONS

U.S. Appl. No. 14/073,342, filed Nov. 6, 2013, McFarlane et al.
U.S. Appl. No. 14/073,351, filed Nov. 6, 2013, Troutman et al.
U.S. Appl. No. 14/073,361, filed Nov. 6, 2013, Allen et al.
U.S. Appl. No. 14/073,372, filed Nov. 6, 2013, Noble et al.
Chacon, S. "Pro Git" published by Apress [online][retrieved on Dec. 12, 2013] retrieved from: http://martinez.io/git-distributed-even-if-your-workflow-isnt, 10 pps.

* cited by examiner

*Primary Examiner* — Syed Hasan
*Assistant Examiner* — Tuan-Khanh Phan
(74) *Attorney, Agent, or Firm* — Lee & Hayes, PLLC

(57) ABSTRACT

Technologies are described herein for distributed storage and retrieval of directed acyclic graphs, such as version control graphs maintained by a version control system. In order to store data contained in a directed acyclic graph, objects stored in the graph may be grouped into chunks utilizing a relatedness heuristic. The chunks may then be stored in a distributed object store. An index to the objects stored in the chunks may also be created that includes an index entry for each object. The index entry for each object includes a unique identifier for the object and data identifying the location of the object in the distributed object store. The index may be utilized to traverse the directed acyclic graph and to obtain all or a portion of the objects in the directed acyclic graph from the distributed object store.

22 Claims, 8 Drawing Sheets

DISTRIBUTED STORAGE AND RETRIEVAL OF DIRECTED ACYCLIC GRAPHS

BACKGROUND

Software developers commonly utilize many different types of tools during the development of a software application. For example, software developers might utilize tools for editing source code and for compiling the source code into executable code. In addition to these tools, software developers might also utilize other types of utility programs to assist with the development of a program. For example, a developer might utilize a version control system ("VCS") to manage changes made to the source code and other components of the program.

A developer might utilize functionality provided by a VCS to manage changes made to source code files and other types of files associated with a program under development. The VCS may store the source code files and other files in a data store, commonly referred to as a source code repository. Such a repository might also be utilized to store a version control graph that describes changes that have been made to the program over time. The source code repository might also be utilized to store other types of data and/or metadata regarding the creation and modification of a program.

Source code repositories are commonly stored in a single location and replicated to other locations. This storage model, however, may limit the durability of a source code repository and might also limit the manner in which the source code repository can be accessed. However, storing a source code repository in a durable, highly available manner may present a number of complex challenges. One challenge associated with storing a source code repository in a shared system stems from the fact that many types of source code repositories are structured as directed acyclic graphs. Directed acyclic graphs may be difficult to store in a replicated system, especially when new data is added often and frequent partial traversals are required, such as when utilized by a VCS.

It is with respect to these and other considerations that the disclosure made herein is presented.

DETAILED DESCRIPTION

Figure 1:
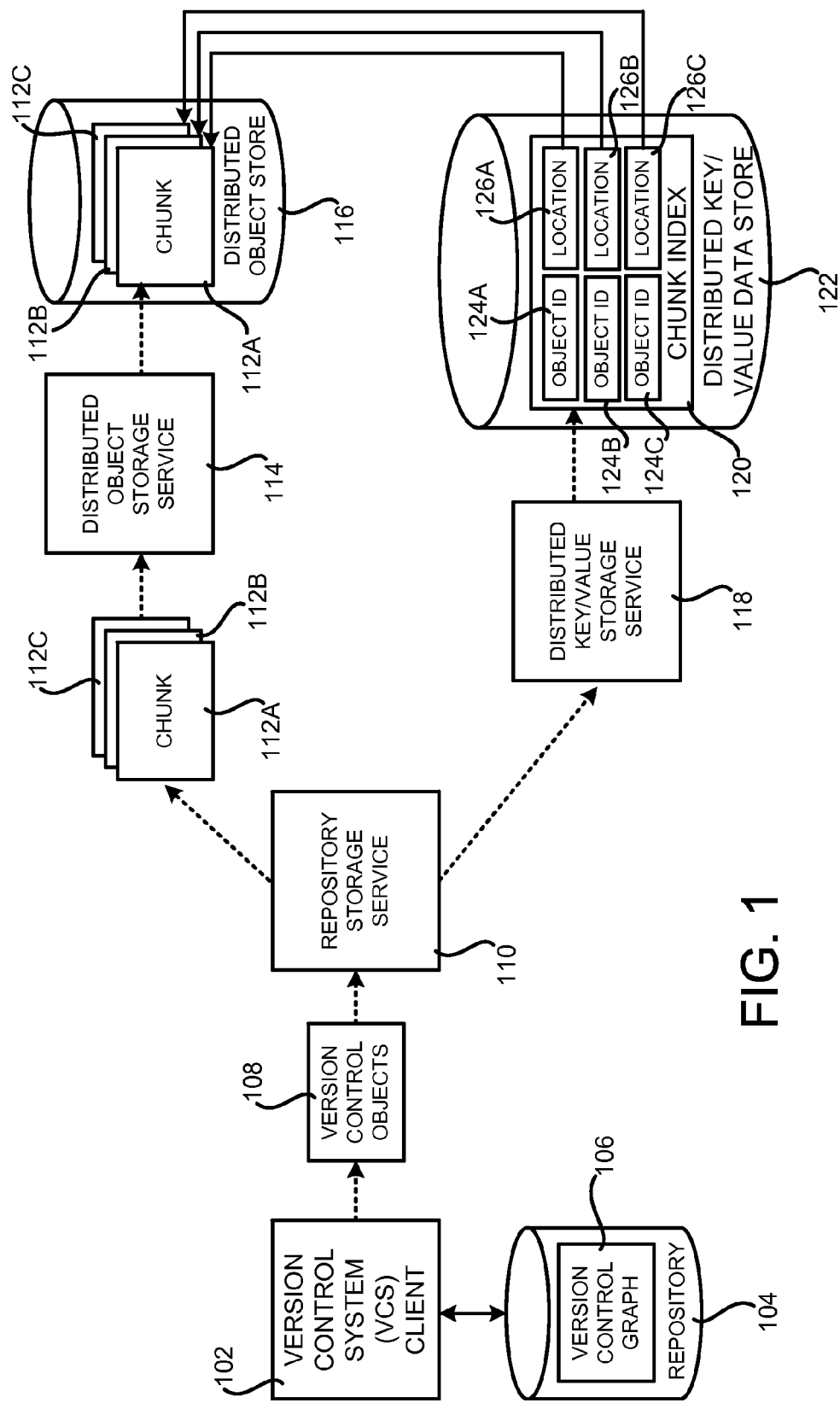
FIG. 1 is a system diagram showing aspects of a mechanism presented herein for distributed storage of a directed acyclic graph, such as a version control graph utilized by a version control system, including several software and hardware components utilized in embodiments disclosed herein.

The following detailed description is directed to technologies for distributed storage and retrieval of directed acyclic graphs, such as a version control graph maintained by a VCS. Through an implementation of the technologies disclosed herein, directed acyclic graphs, such as version control graphs, can be stored in a distributed fashion. Directed acyclic graphs stored in this manner can then be traversed and retrieved in an efficient way. Through the use of such a mechanism, the durability of and access to a version control graph or other type of directed acyclic graph may also be improved.

A mechanism is provided in one embodiment disclosed herein for storing a directed acyclic graph, such as a version control graph, in a distributed fashion. A directed acyclic graph is formed by a collection of vertices (or "nodes") and directed edges, each edge connecting one vertex to another, such that there is no way to start at some vertex and follow a sequence of edges that eventually loops back to the starting vertex again. Each node of a directed acyclic graph may include one or more objects. For example, in the case of a version control graph, each node may include one or more version control objects such as, but not limited to, objects describing changes like commit objects, objects describing collections of files like tree objects, and/or a file version objects, which may be referred to as "blob" objects. The objects may refer to other objects in the same or other nodes. For example, a tree object might reference other tree objects or blob objects.

In order to store objects in a directed acyclic graph in a distributed manner, the objects to be stored are first received. For example, in the case of a version control graph, a VCS client might provide the version control objects that are to be stored. The received objects are then grouped into "chunks." Chunks are data structures storing one or more objects from a directed acyclic graph, such as version control objects, for storage in a distributed object store. The received objects are grouped into chunks utilizing a relatedness heuristic in some embodiments. For example, and without limitation, a relatedness heuristic that defines related objects as objects having the same type may be utilized. Using this type of relatedness heuristic, objects of the same type will be placed in the same chunk. A relatedness heuristic that defines related objects based upon the distance of objects from one another in the directed acyclic graph might also be utilized. In this way, objects that are close to one another (e.g. objects in the same or adjacent nodes) may be assigned to the same chunk. A relatedness heuristic that defines related objects based upon the similarity of their contents might also be utilized. Other types of heuristics might also be utilized to assign objects to chunks. In some embodiments, a verification process might also be performed to ensure that all objects that are referenced by objects received for storage have been received and/or previously stored. An error may be generated if any referenced objects are not received.

Once the objects to be stored have been placed into chunks, the chunks may be provided to a distributed object storage service for storage in a distributed object store. The distributed object store may store the chunks across multiple computing nodes. An index to the stored chunks may also be created utilizing a distributed key/value data storage service or other type of distributed data store. For example, in one embodiment a distributed key/value data storage service is utilized to create a chunk index that includes an index entry for each object stored in the distributed object store. Each index entry includes a unique identifier ("ID") for each object, such as the SHA-1 cryptographic hash of the object in one particular embodiment. Each index entry also includes data identifying the location within the distributed object store of the corresponding object from the directed acyclic graph. The index entry might also identify the location of the object within a particular chunk. Using the chunk index, each object can be referenced and retrieved from the distributed object store using its unique ID. As will be discussed in greater detail below, the unique IDs of stored objects can be utilized to traverse the directed acyclic graph and to retrieve all or a portion of the graph.

In order to retrieve the objects for all or a portion of a directed acyclic graph from the distributed object store, an entry point object may be received. The entry point object defines an entry point into the directed acyclic graph from which retrieval should begin. To retrieve an entire version control graph, for example, the entry point object may be a tree object at the head of the version control graph. The entry point object might also be defined in order to retrieve any sub-portion of the directed acyclic graph. A stopping condition for the retrieval of objects might also be specified. For example, a certain node in the directed acyclic graph may be specified as a stopping point for retrieval. Other types of stopping conditions might also be specified.

Once the entry point object has been received, the unique ID for the entry point object is utilized to retrieve the location of the entry point object from the distributed key/value storage service. The location of the object may then be utilized to retrieve the chunk containing the entry point object or just the entry point object itself from the distributed object store.

The retrieved entry point object may include the unique IDs of other referenced objects. For example, and without limitation, in the case of a version control graph a commit object might reference a parent list of commit objects, a tree object might reference a list of children objects, and a blob object might reference a delta base. In order to retrieve any referenced objects, the unique IDs of these objects are utilized to retrieve the chunks containing the referenced objects from the distributed object store or the objects themselves. If the chunks containing the referenced objects have already been retrieved from the distributed object store, the referenced objects may be obtained directly from the previously retrieved chunks. This process may continue until no additional referenced objects remain to be retrieved or until a specified stopping condition has been encountered. The objects may then be provided in response to the request for all or a portion of the directed acyclic graph. For example, the retrieved objects may be provided in response to a request from a VCS client for all or a portion of a version control graph in one particular embodiment.

Mechanisms are also provided herein for optimizing the contents of chunks of objects from a directed acyclic graph that have been stored in a distributed object store in the manner described above. In particular, in order to optimize the storage of the objects, a list of objects needed by the directed acyclic graph may be generated or otherwise obtained. A list of objects stored in chunks in the distributed object store might also be generated or otherwise obtained. Using the lists of objects, a list may be generated of objects that have been stored in the distributed object store but that are not needed by the directed acyclic graph. Each chunk storing only unneeded objects may then be deleted from the distributed object store. For each chunk that includes both needed and unneeded objects, a new chunk may be created and stored that contains only the needed objects and the chunk containing the unneeded objects may be deleted. Index entries in the chunk index may be updated to reflect the new location of the objects in the newly created chunks.

Other mechanisms might also be utilized to optimize the contents of the chunks. For example, and without limitation, objects might be initially stored in chunks in the order that the objects are received. At a subsequent time, the objects might be reorganized into different chunks utilizing one of the relatedness heuristics described above. For example, and without limitation, the objects might be reorganized into different chunks based upon their type, upon their distance from one another in the directed acyclic graph, or upon the similarity of their contents. In this way, access to the objects contained in the chunks stored in the distributed object store may be optimized.

It should be appreciated that although the embodiments disclosed herein are primarily presented in the context of the storage and traversal of a version control graph, the concepts and technologies disclosed herein may be utilized to store any type of directed acyclic graph. Accordingly, the embodiments presented herein are not limited to use in storing a version control graph. Additional details regarding the various aspects described above will be presented below with regard to FIGS. 1-8.

It should be appreciated that the subject matter presented herein may be implemented as a computer process, an electronic computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, electronic-book readers, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 is a system diagram showing aspects of a mechanism presented herein for distributed storage of a directed acyclic graph, such as a version control graph 106 utilized by a version control system ("VCS"), including several software and hardware components utilized in embodiments disclosed herein. As known in the art, a VCS 102 provides functionality for managing changes made to source code files and other types of files associated with a program (which may be referred to herein as a "software component"). One specific example of a VCS is the GIT open source distributed version control and source code management system.

As shown in FIG. 1, a VCS client 102 may store a software component in a data store commonly referred to as a "repository" 104. The repository 104 might also be utilized to store a version control graph 106 that describes changes that have been made to a software component maintained by the VCS client 102. The repository 104 might also be utilized to store other types of data and/or metadata regarding the creation and modification of the software component. It should be appreciated that while the embodiments disclosed herein are primarily presented in the context of the GIT distributed version control and source code management system, the technologies described herein may be utilized with any type of VCS.

As discussed above, the version control graph 106 may be organized as a directed acyclic graph. A directed acyclic graph is formed by a collection of vertices (or "nodes") and directed edges, each edge connecting one vertex to another, such that there is no way to start at some vertex and follow a sequence of edges that eventually loops back to the starting vertex again. Each node of a directed acyclic graph may include one or more objects. For example, in the case of a version control graph 106, each node may include one or more version control objects 108 generated by the VCS client 102 such as, but not limited to, a tag object, a commit object, a tree object, or a blob object. The objects in the version control graph 106 may refer to other objects in the same or other nodes. For example, a tree object in the version control graph 106 might reference other tree objects or blob objects. As discussed above, the technologies disclosed herein are not limited to storing a version control graph 106 and may be utilized to store any type of data that is organized as a directed acyclic graph.

In one implementation, a repository storage service 110 implements at least a portion of the functionality disclosed herein for distributed storage and retrieval of a directed acyclic graph, such as a version control graph 106. In particular, the repository storage service 110 may receive and process requests from one or more VCS clients 102 to store all or a portion of the version control graph 106. For example, and without limitation, the VCS 102 may push one or more version control objects 108 to the repository storage service 110 for storage.

In response to receiving version control objects 108 for storage, the repository storage service 110 groups the received version control objects 108 into chunks 112A-112C. As mentioned briefly above, the chunks 112A-112C are data structures storing one or more objects from a directed acyclic graph, such as version control objects 108, for storage in a distributed object store 116. In some embodiments, the repository storage service 110 is configured to group received objects into chunks 112 utilizing a relatedness heuristic. For example, and without limitation, a relatedness heuristic that defines related objects as objects having the same type may be utilized. Using this type of relatedness heuristic, objects of the same type will be placed in the same chunk 112. As a specific example, tree version control objects 108 may be grouped together in chunks 112, blob version control objects 108 may be grouped together in chunks 112, commit version control objects 108 may be grouped together in chunks 112, and tag version control objects 108 may be grouped together in chunks 112 using this type of relatedness heuristic.

A relatedness heuristic that defines related objects based upon the distance of objects from one another in a directed acyclic graph might also be utilized. In this way, objects that are close to one another (e.g. objects in the same or adjacent nodes) may be assigned to the same chunk 112. Other types of heuristics might also be utilized to assign objects in a directed acyclic graph, such as the version control objects 108, to chunks 112. In some embodiments, the repository storage service 110 might also perform a verification process to ensure that all objects that are referenced by objects received for storage have been received and/or previously stored in the distributed object store 116. An error may be generated if any referenced objects are not received. Details regarding one illustrative verification process performed by the repository storage service 110 will be provided below with regard to FIG. 3.

It should be appreciated that the version control objects 108 may initially be placed into chunks 112 in the order that they are received from the VCS client 102. One of the heuristics described above, or another type of heuristic, may later be used to reorganize the version control objects 108 into chunks 112 in a manner more suited for efficient retrieval.

Once the repository storage service 110 has placed the version control objects 108 to be stored into chunks 112, the repository storage service 110 may provide the chunks 112 to a distributed object storage service 114 for storage in a distributed object store 116. As mentioned above, the distributed object store 116 may store the chunks 112 in a distributed manner across multiple computing nodes.

The repository storage service 110 might also create an index 120 to the stored chunks 112 using a distributed key/value data storage service 118 in one embodiment. For example, in one particular implementation a distributed key/value data storage service 118 is utilized to create an index 120 (which may be referred to herein as the "chunk index 120") in a distributed key/value data store 122 that includes an index entry for each object stored in the distributed object store 116. Each index entry includes a unique object identifier ("object ID") 124 for each stored object, such as the SHA-1 cryptographic hash of the object in one particular embodiment. Each index entry also includes data identifying the location 126 within the distributed object store 116 of the corresponding object from the directed acyclic graph. For example, and without limitation, the location 126 might identify a location of a chunk 112 within the distributed object store 116. The location 126 might also specify a location of an object within a chunk 112. For example, and without limitation, the location 126 might specify a byte offset within a chunk 112. The location of an object within the distributed object store 116 and/or within a particular chunk 112 might be specified in other ways in other implementations.

In the example shown in FIG. 1, for instance, three index entries have been created. Each of the index entries corresponds to a version control object 108 stored in a chunk 112 in the distributed object store 116. For example, an index entry has been created for a first version control object 108 having a unique object ID 124A and a location 126A in a chunk 112A in the distributed object store 116. An index entry has also been created for a second version control object 108 having a unique object ID 124B and a location 126B in a chunk 112B in the distributed object store 116. An index entry has also been created in the index 120 for a third version control object 108 having a unique object ID 124C and a location 126C in a chunk 112C in the distributed object store 116. It should be appreciated that although three chunks 112A-112C and three index entries have been illustrated in FIG. 1, many more chunks 112 and index entries may be created and stored in a similar manner. Additional details regarding the storage of version control objects 108 in chunks 112 in a distributed object store 116, and the creation of the chunk index 120 will be provided below with regard to FIGS. 2-4.

The repository storage service 110 also provides functionality for traversal and retrieval of a directed acyclic graph stored in the manner described above. For example, and without limitation, a VCS client 102 may request all or a portion of a version control graph 104 that was previously stored by the repository storage service 110. In response to such a request, the repository storage service 110 may utilize the chunk index 120 to identify the location in the distributed object store 116 of the requested objects, and to retrieve each object from the distributed object store 116. In this way, the unique object IDs 124 of stored objects can be utilized to traverse the directed acyclic graph and to retrieve all or a portion of the graph in response to a request from the VCS client 102. Additional details regarding one mechanism disclosed herein for traversing a directed acyclic graph to retrieve stored objects from the distributed object store 116 will be provided below with regard to FIGS. 5 and 6.

The repository storage service 110 might also provide functionality for optimizing the chunks 112 of objects from a directed acyclic graph that have been stored in the distributed object store 116 in the manner described above. Details regarding one illustrative mechanism for optimizing the contents of the chunks 112 will be provided below with regard to FIG. 7.

Figure 2:
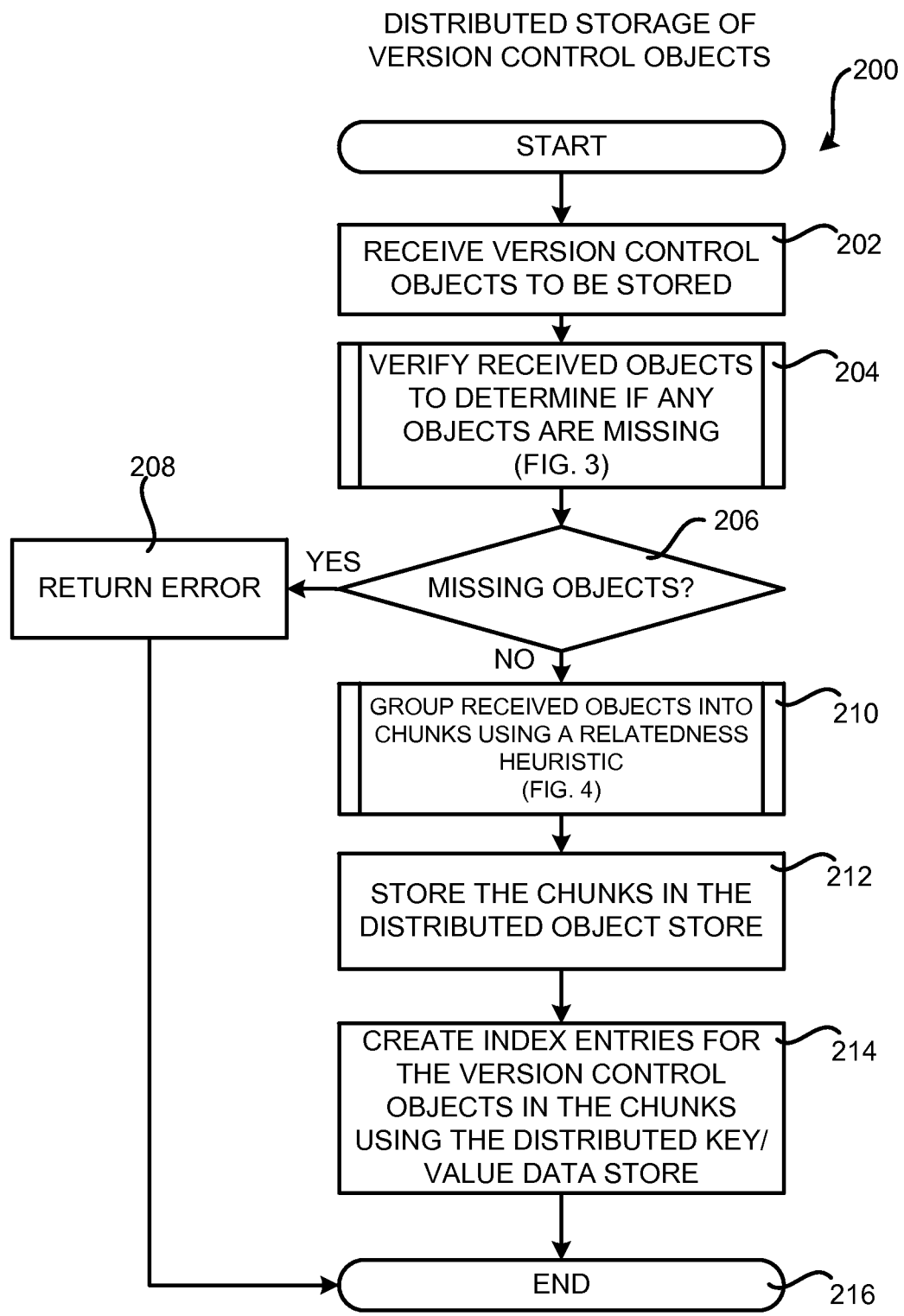
FIG. 2 is a flow diagram showing aspects of one illustrative routine disclosed herein for distributed storage of objects contained in a directed acyclic graph, such as version control objects maintained in a version control graph, according to embodiments described herein.

FIG. 2 is a flow diagram showing aspects of one illustrative routine 200 disclosed herein for distributed storage of objects contained in a directed acyclic graph, such as version control objects 108 maintained in a version control graph 106, according to embodiments described herein. It should be appreciated that the logical operations described herein with respect to FIG. 2, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. Some or all of these operations might also be performed by components other than those specifically identified.

The routine 200 begins at operation 202, where the repository storage service 110 receives one or more objects, such as the version control objects 108, to be stored. As mentioned above, the VCS client 102 may push the version control objects 108 stored in all or a portion of the version control graph 106 to the repository storage service 110 for storage. Prior to pushing objects 108 to the repository storage service 110, the VCS client 102 might also query the repository storage service 110 to determine which objects 108 have been previously stored. In this way, the VCS client 102 will not push objects 108 to the repository storage service 110 for storage that have been previously stored.

In response to receiving one or more version control objects 108 for storage, the routine 200 proceeds from operation 202 to operation 204. At operation 204, the repository storage service 110 verifies the received objects 108 to determine if any objects 108 are missing. For example, and without limitation, the repository storage service 110 may determine whether any objects 108 have been received for storage that reference other objects 108 that have not been received or previously stored in the distributed object store 116. If any objects 108 are determined to be missing, the routine 200 proceeds from operation 206 to operation 208, where the repository storage service 110 may return an error to the VCS client 102. If no objects 108 are determined to be missing, the routine 200 proceeds from operation 206 to operation 210. One illustrative routine for verifying received objects 108 will be described in detail below with regard to FIG. 3.

At operation 210, the repository storage service 110 may group the received objects 110 into chunks 112 based upon a heuristic, such as a relatedness heuristic. As mentioned briefly above, the relatedness heuristic may group objects into chunks 112 based upon their type, their distance from one another, or based upon another measure of relatedness. As also mentioned above, the repository storage service 110 might initially place received objects 108 into chunks 112 in the order that the objects 108 are received from the VCS client 102. The contents of the chunks 112 may be later reorganized utilizing a relatedness heuristic or another type of heuristic.

Once the repository storage service 110 has grouped the received objects 108 into chunks 112, the routine 200 proceeds to operation 212, where the repository storage service 110 transmits the chunks 112 to the distributed object storage service 114 for storage. As discussed above, the repository storage service 110 stores the chunks 112 in the distributed object store 116. The routine 200 then proceeds from operation 212 to operation 214.

At operation 214, the repository storage service 110 creates index entries in the chunk index 120 for the stored objects 108. As discussed above, each index entry corresponds to a stored object 108 and includes the unique object ID 124 of the object and the location 126 of the object in the distributed object store 116. Once all of the objects 108 to be stored have been stored and indexed in the manner described above, the routine 200 proceeds from operation 214 to operation 216, where it ends.

It should be appreciated that some or all of the operations shown in FIG. 2 may be performed asynchronously. For example, and without limitation, the receiving, verification, and storage operations described above may be performed asynchronously in some implementations.

Figure 3:
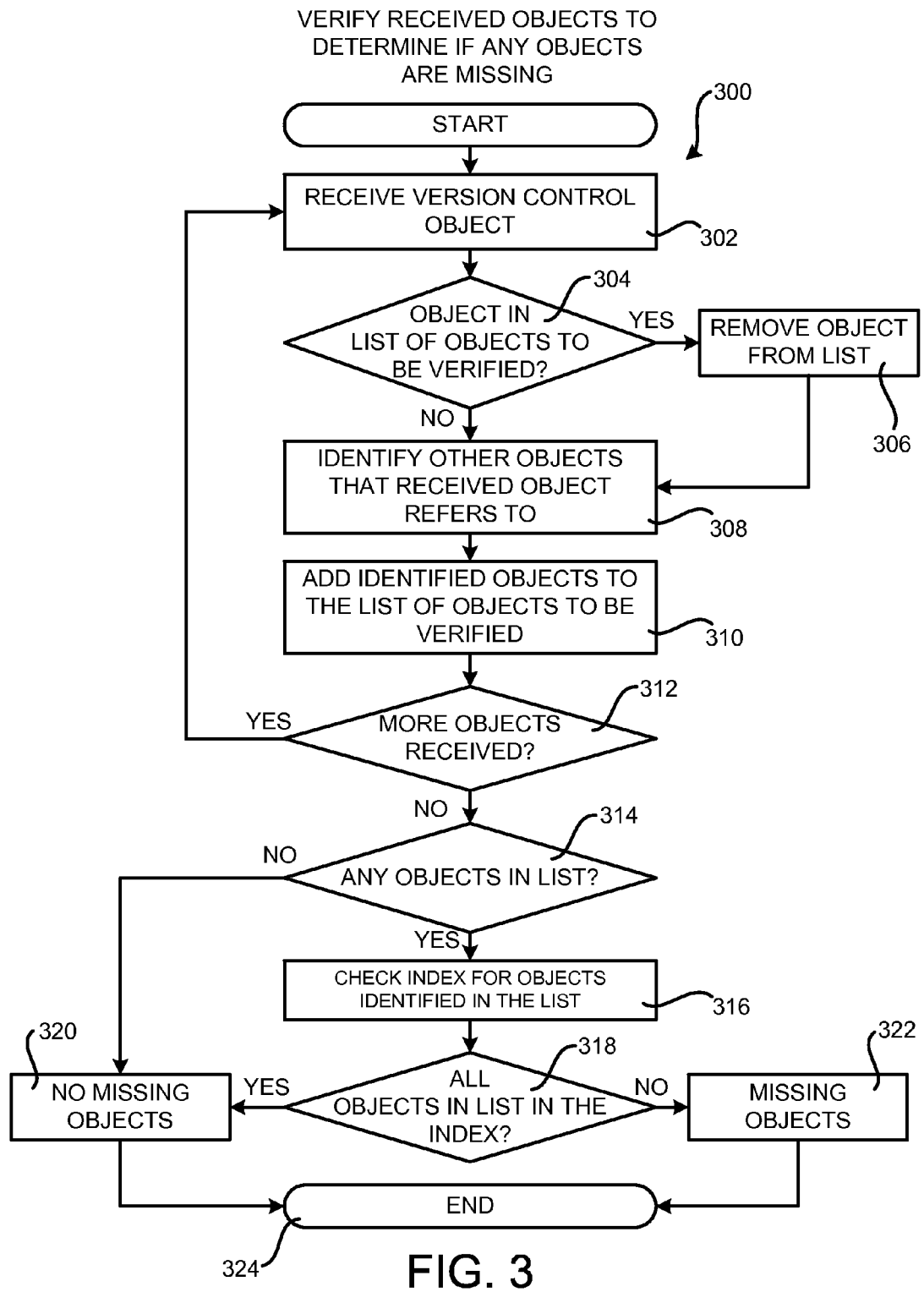
FIG. 3 is a flow diagram showing aspects of one illustrative routine disclosed herein for determining if objects are missing that relate to other objects in a directed acyclic graph, such as a version control graph, according to embodiments described herein.

FIG. 3 is a flow diagram showing aspects of one illustrative routine 300 disclosed herein for determining if objects are missing that relate to other objects in a directed acyclic graph, such as a version control graph 106, according to embodiments described herein. The routine 300 begins at operation 302, where the repository storage service 110 receives an object to be stored, such as a version control object 108. The routine 300 then proceeds to operation 302, where the repository storage service 110 determines whether the received object is identified in a list of objects to be verified. If the received object is in the list of objects to be verified, the routine 300 proceeds to operation 306, where the received object is removed from the list, thereby indicating that the object has been received and no longer needs to be verified. The routine 300 then proceeds from operation 306 to operation 308.

If the received object is not in the list of objects to be verified, the routine 300 proceeds from operation 304 to operation 308, where the repository storage service 110 identifies other objects, if any, that the received object refers to. For example, and without limitation, a tree object might refer to a list of children objects, such as other tree objects or blob objects. Similarly, commit objects may refer to a list of parent commit objects. Once referenced objects, if any, have been identified, the routine 300 then proceeds to operation 310, where the repository storage service 110 adds any objects identified at operation 308 to the list of objects to be verified.

From operation 310, the routine 300 proceeds to operation 312, where the repository storage service 110 determines if more objects have been received that remain to be verified. If so, the routine 300 proceeds back to operation 302, described above, where the received objects may be verified in the manner described above. If no additional objects have been received, the routine 300 proceeds from operation 312 to operation 314.

At operation 314, the repository storage service 110 determines whether any objects are identified in the list of objects to be verified. If no objects are identified in the list, this indicates that all referenced objects have been received. Accordingly, the routine 300 proceeds from operation 314 to operation 320, where an indication may be provided that there are no missing objects. The routine 300 may then proceed from operation 320 to operation 324, where it ends.

If, at operation 314, the repository storage service 110 determines that objects remain in the list of objects to be verified, the routine 300 proceeds from operation 314 to operation 316. At operation 316, the repository storage service 110 checks the chunk index 120 to determine if the objects in the list of objects to be verified have been previously stored in the distributed object store 116. In particular, the repository storage service 110 may utilize the unique object ID 124 of each object in the list of objects to be verified to determine if each object is identified in the chunk index 120.

If all of the objects identified in the list of objects to be verified are identified in the chunk index 120, then there are no missing objects. Accordingly, in this case the routine 300 proceeds from operation 318 to operation 320, described above. If, however, at least one of the objects in the list of objects to be verified is not identified in the chunk index 120, the routine 300 proceeds from operation 318 to operation 322 where an indication may be provided that objects are missing. As discussed above with regard to FIG. 1, an error message might also be provided to the VCS client 102 in response to determining that objects are missing. Other actions might also be taken in response to determining that objects are missing. From operations 320 and 322, the routine 300 proceeds to operation 324, where it ends.

Figure 4:
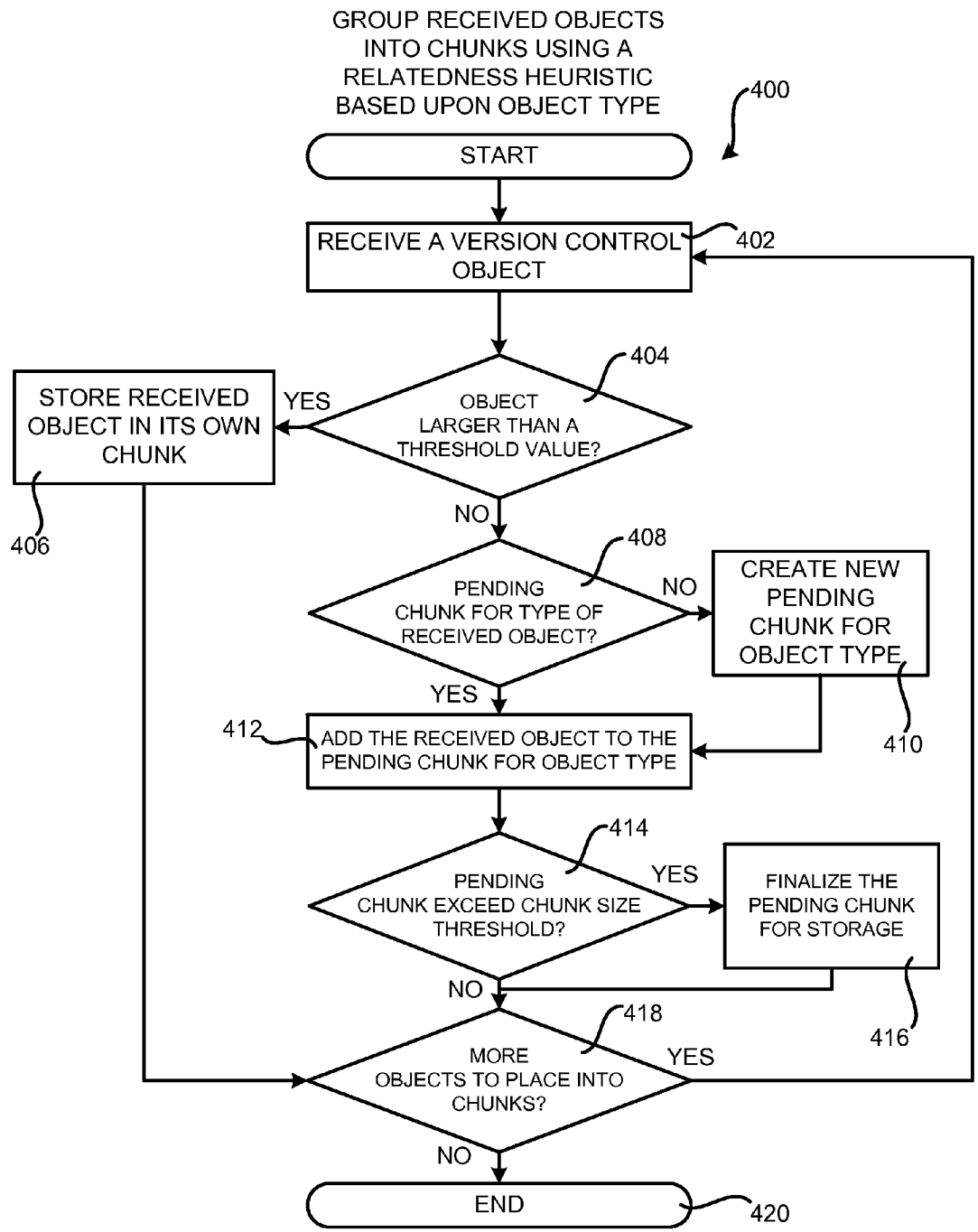
FIG. 4 is a flow diagram showing one illustrative mechanism for grouping objects in a directed acyclic graph, such as a version control graph, into chunks for storage in a distributed object store, according to one embodiment disclosed herein.

FIG. 4 is a flow diagram showing a routine 400 that illustrates a mechanism for grouping objects in a directed acyclic graph, such as version control objects 108 in a version control graph 106, into chunks 112 for storage in a distributed object store 116, according to one embodiment disclosed herein. In the routine 400, the repository storage service 108 utilizes a relatedness heuristic that is based upon object type. As discussed above, however, the repository storage service 108 may utilize other types of relatedness heuristics in other embodiments to group objects into chunks 112.

The routine 400 begins at operation 402, where the repository storage service 110 receives an object for storage, such as a version control object 108. The routine 400 then proceeds from operation 402 to operation 404, where the repository storage service 110 determines whether the received object is larger than a threshold value. For example, in one embodiment, if the received object is a commit version control object 108, a tag version control object 108, or a tree version control object 108, the repository storage service 110 may determine whether the object is larger than 66 k. If the received object is a blob version control object 108, the repository storage service 110 may determine whether the object is larger than 2 mb. Other thresholds might also be utilized in other embodiments.

If the received object is larger than the specified threshold, the routine 400 proceeds to operation 406, where the repository storage service 110 may store the received object in its own chunk 112. If the received object is not larger than the specified threshold, the routine 400 proceeds from operation 404 to operation 408, where the repository storage service 110 determines whether a chunk 112 has been previously created for storing objects of the same type as the received object and is pending (i.e. can hold more objects). If a chunk 112 is not pending for objects of the same type as the received object, the routine 400 proceeds from operation 408 to operation 410. At operation 410, the repository storage service 110 creates a new chunk 112 for storing objects of the same type as the received object. For example, if the received object is a tree version control object 108, the repository storage service 110 will create a chunk 112 for storing tree objects.

If, at operation 408, the repository storage service 110 determines that a chunk 112 is pending for objects having the same type as the received object, the routine 400 proceeds from operation 408 to operation 412. At operation 412, the repository storage service 110 adds the object received at operation 402 to the pending chunk for the object type. The routine 400 then proceeds from operation 412 to operation 414.

At operation 414, the repository storage service 110 determines if the pending chunk 112 to which the received object was added at operation 412 exceeds a threshold size. For example, and without limitation, for chunks 112 storing commit, tree, or tag version control objects 108, the threshold size may be set at 100 k. For blob version control objects 108, the threshold may be set to 3 mb. Other thresholds might also be utilized in other implementations.

If the repository storage service 110 determines at operation 414 that the pending chunk 112 exceeds the threshold size, the routine 400 proceeds to operation 416. At operation 416, the repository storage service 110 finalizes the chunk 112 for storage in the distributed object store 116. By finalizing the pending chunk 112 in this manner, no additional objects will be added to the chunk 112 and the chunk 112 can be provided to the distributed object storage service 114 for storage. If, at operation 414, the repository storage service 110 determines that the pending chunk 112 does not exceed the threshold size, the routine 400 proceeds from operation 414 to operation 418.

At operation 418, the repository storage service 110 determines whether additional objects remain to be placed into chunks 112. If additional objects remain to be chunked, the routine 400 proceeds back to operation 402, described above. If no additional objects remain to be placed into chunks 112, the routine 400 proceeds from operation 418 to operation 420, where it ends.

Figure 5:
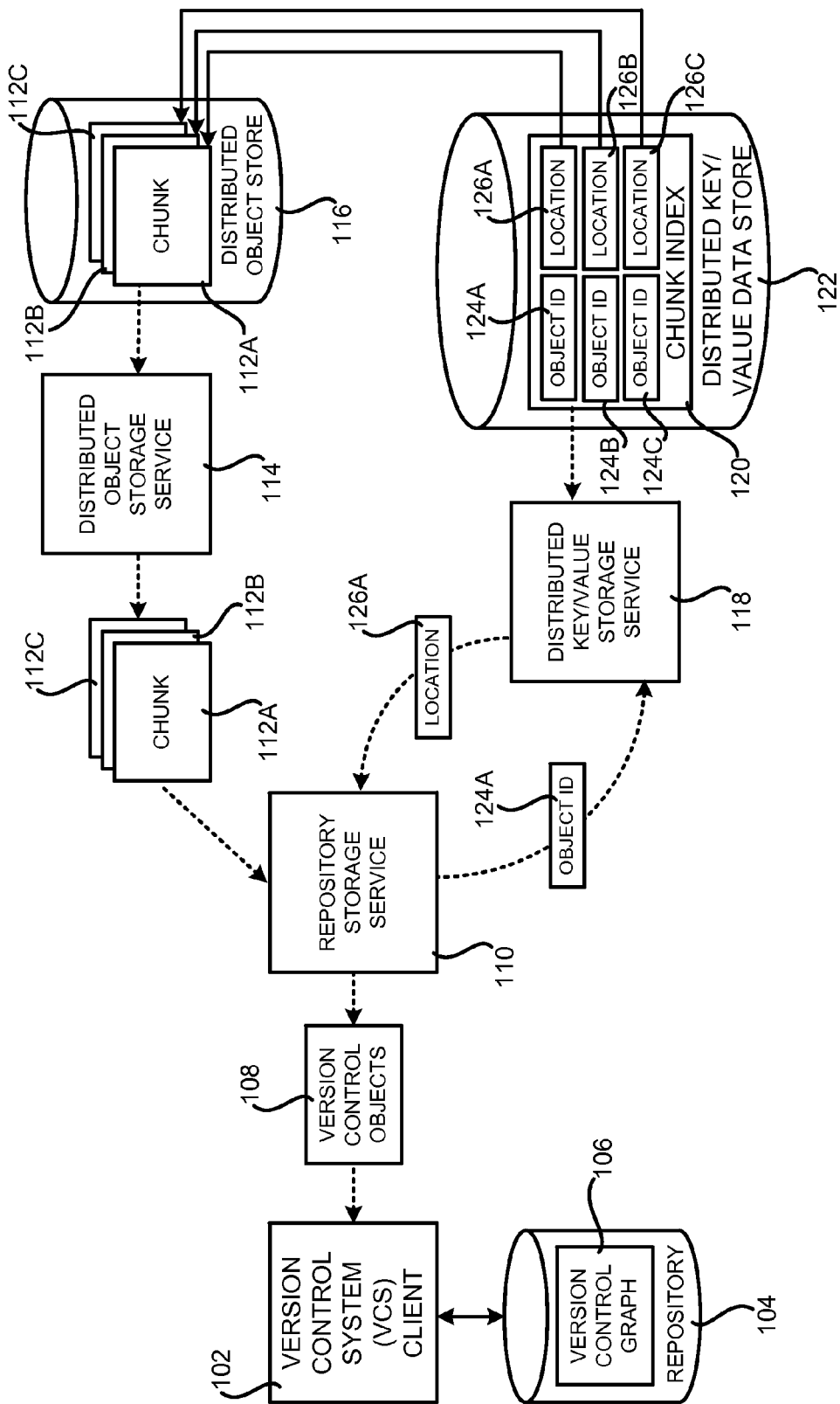
FIG. 5 is a system diagram showing aspects of a mechanism presented herein for retrieving objects in a directed acyclic graph, such as a version control graph utilized by a version control system, from a distributed object store, including several software and hardware components utilized in embodiments disclosed herein.

FIG. 5 is a system diagram showing aspects of a mechanism presented herein for retrieving objects in a directed acyclic graph, such as a version control graph 106 utilized by a version control system, from a distributed object store 116, including several software and hardware components utilized in embodiments disclosed herein. As discussed briefly above, the repository storage service 110 provides functionality for traversal and retrieval of a directed acyclic graph stored in the manner described above. For example, and without limitation, a VCS client 102 may request all or a portion of the version control objects 108 in a version control graph 104 that were previously stored by the repository storage service 110.

In response to receiving a retrieval request from the VCS 102, the repository storage service 110 may utilize the chunk index 120 to identify the location in the distributed object store 116 of the requested objects, and to retrieve each object from the distributed object store 116. For instance, the repository storage service 110 may transmit an object ID 124A for an object 108 to the distributed key/value storage service 118. In response thereto, the distributed key/value storage service 118 locates the received object ID 124A in the chunk index 120 and returns the location 126A associated with the specified object ID 124A. The repository storage service 110 may then utilize the location 126A to retrieve the requested object 108 or the chunk 112 containing the requested object 108 from the distributed object store 116. Other objects 108 referenced by the retrieved object 108 may be retrieved in a similar manner. In this way, the unique object IDs 124 of stored objects can be utilized to traverse a directed acyclic graph and to retrieve all or a portion of the graph in response to a request from the VCS client 102. Additional details regarding this process will be provided below with regard to FIG. 6.

Figure 6:
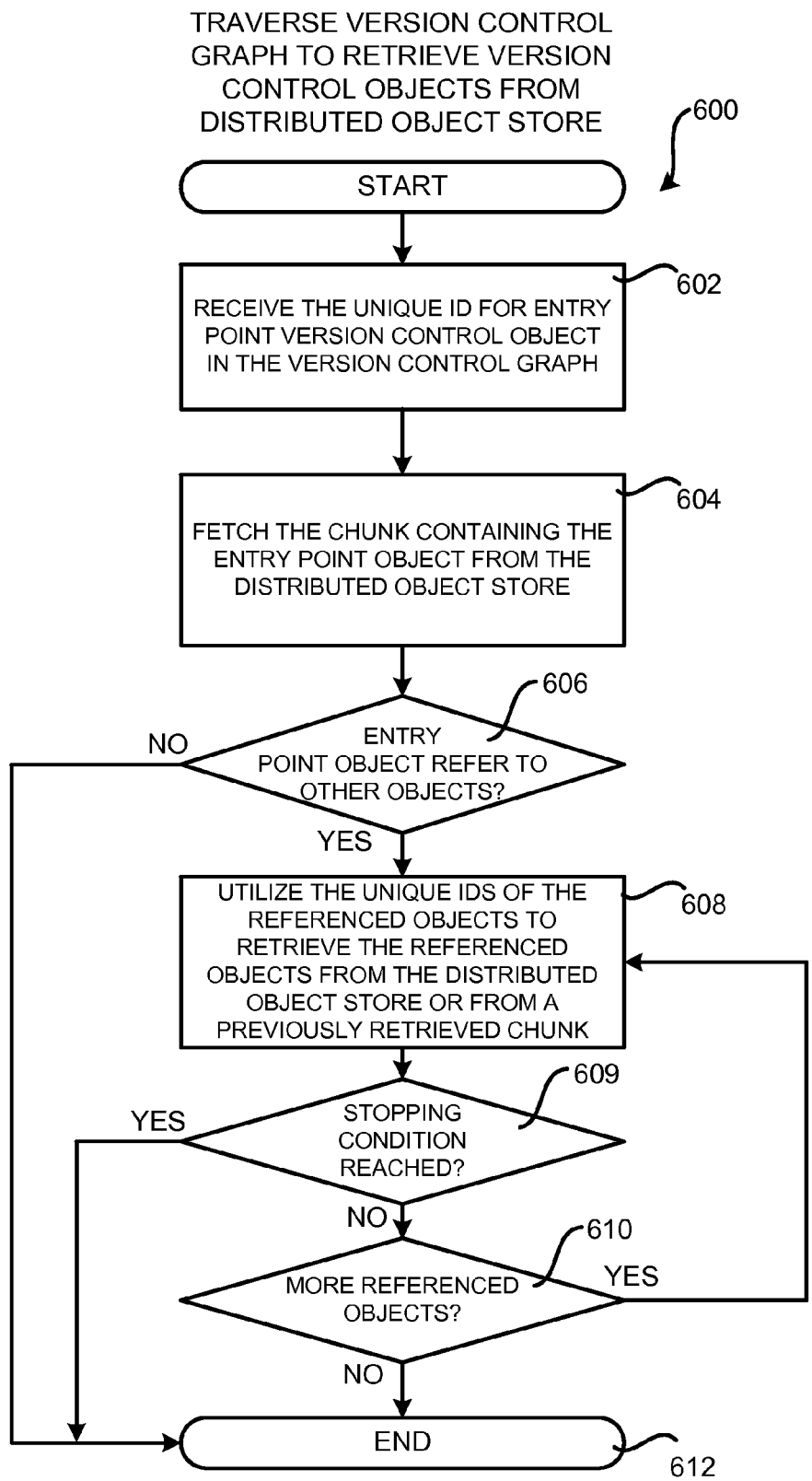
FIG. 6 is a flow diagram showing aspects of one illustrative routine disclosed herein for traversing a directed acyclic graph, such as a version control graph, in order to retrieve objects of the directed acyclic graph from a distributed object store, according to embodiments described herein.

FIG. 6 is a flow diagram showing a routine 600 that illustrates aspects of one mechanism disclosed herein for traversing a directed acyclic graph, such as a version control graph 106, in order to retrieve objects of the directed acyclic graph from a distributed object store 116, according to one embodiment described herein. The routine 600 begins at operation 602, where the repository storage service 110 receives a request for all or a portion of the version control graph 106 from the VCS client 102. The request may include the unique ID 124 of an entry point object into the version control graph 106. The entry point object is the object in the version control graph 106 from which the repository storage service 110 should begin retrieving objects. In order to retrieve the entire version control graph 106, for instance, the VCS client 102 would specify the tree object at the top of the version control graph 106 as the entry point object.

From operation 602, the routine 600 proceeds to operation 604, where the repository service 110 fetches the chunk 112 containing the specified entry point object from the distributed object store 116 or the entry point object itself. As discussed above, the repository storage service 110 may utilize the unique object ID 124 associated with an object 108 to retrieve the location 126 of the object 108 in the distributed key/value data store 122. The retrieved location 126 can then be utilized to retrieve the desired object 108 or the chunk 112 containing the desired object 108 from the distributed object storage service 114. Once the entry point object or the chunk 112 containing the entry point object has been retrieved, the routine 600 proceeds from operation 604 to operation 606. It should be appreciated that an object may be retrieved directly from the distributed object store 116 rather than a chunk 112 containing the object when it is known in advance that the object does not reference other objects. In this way, an entire chunk is not retrieved when only a single object is needed.

At operation 606, the repository storage service 110 determines if the entry point object references any other version control objects 108 in the version control graph 106. If the entry point object does not reference any other version control objects 108, then no additional objects 108 remain to be retrieved. Accordingly, in this case, the retrieved entry point object may be provided to the VCS client 102 in response to the object retrieval request. The routine 600 then proceeds to operation 612, where it ends.

If, at operation 606, the repository storage service 110 determines that the entry point object does reference other version control objects 108, the routine 600 proceeds from operation 606 to operation 608. At operation 608, the repository storage service 110 utilizes the unique object IDs 124 of any referenced objects 108 to retrieve the chunks 112 containing these objects 108 from the distributed object store 116. If a chunk 112 containing a referenced object 108 has been previously retrieved from the distributed object store 116, the object 108 may be obtained from the previously retrieved chunk 112 rather than from the distributed object store 116.

From operation 608, the routine 600 proceeds to operation 609, where a determination is made as to whether a specified stopping condition has been encountered. As mentioned briefly above, one or more stopping conditions may be specified, such as encountering a certain node within the version control graph 106 during traversal. If a stopping condition has been specified and the specified stopping condition has been reached at operation 609, the routine 600 proceeds from operation 609 to operation 612, where it ends. If a stopping condition has not been detected, the routine 600 proceeds from operation 609 to operation 610.

At operation 610, the repository storage service 110 determines whether any retrieved objects 108 reference other objects that remain to be retrieved. If additional referenced objects 108 remain to be retrieved, the routine 600 proceeds back to operation 608, where additional objects 108 are retrieved from the distributed object store 116 or a previously retrieved chunk 112. This process may continue until no additional objects 108 remain to be retrieved from the distributed object store 116. If no additional objects 108 remain to be retrieved, the repository storage service 110 may provide the retrieved objects 108 as a response to the retrieval request received from the VCS client 102. The routine 600 then proceeds from operation 610 to operation 612, where it ends.

It should be appreciated that some or all of the operations shown in FIG. 6 may be performed asynchronously. For example, and without limitation, the fetching of objects and returning the objects to the requesting VCS client 102 may be performed asynchronously in some implementations.

Moreover, some of the described operations might be parallelized. For example, and without limitation, multiple different computer systems might be utilized to retrieve sub-portions of a version control graph 106 in parallel. The results of the retrieval might then be combined for provision to the requesting VCS client 102. Other aspects of the routine 600 might also be parallelized in other implementations.

Figure 7:
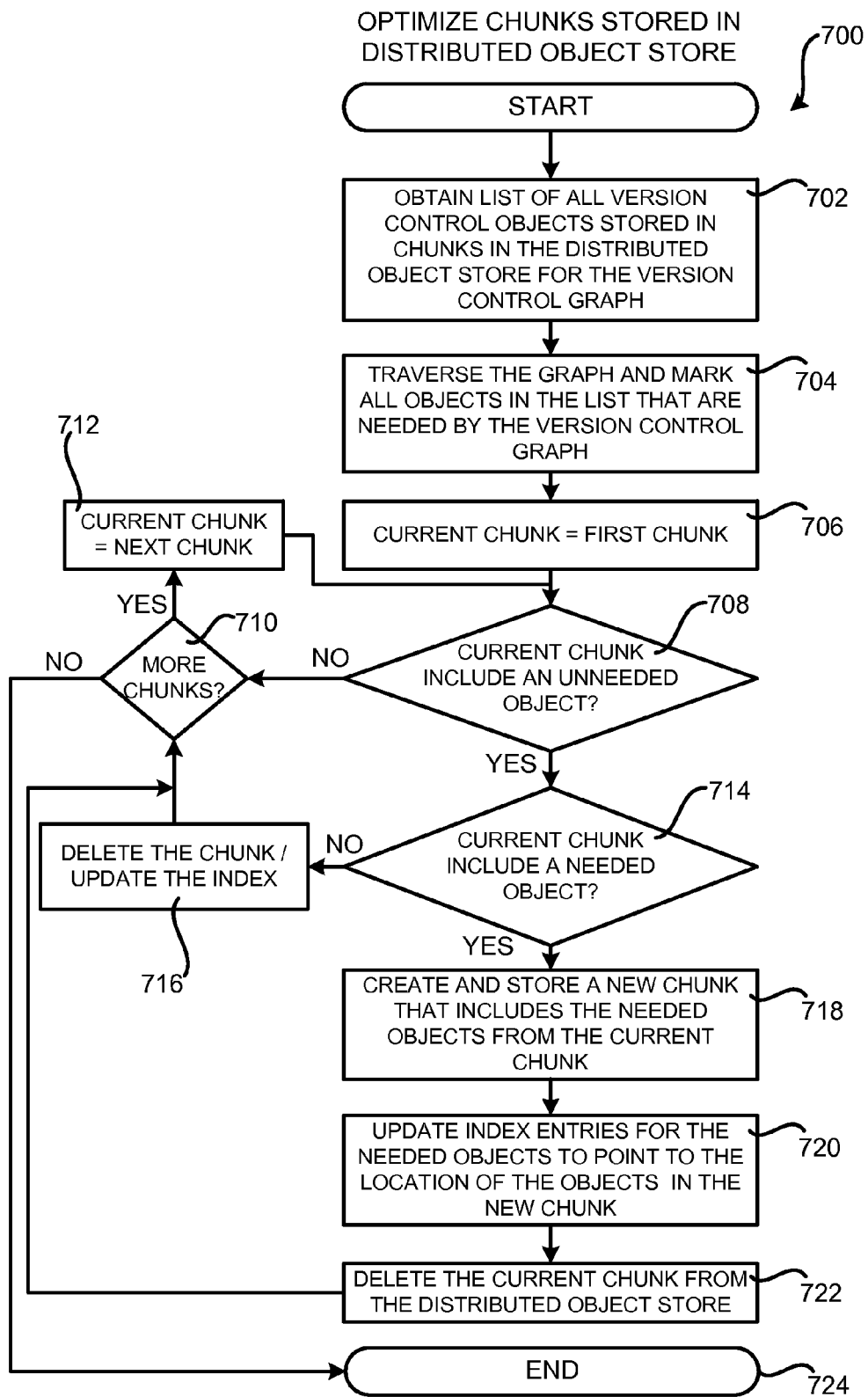
FIG. 7 is a flow diagram showing aspects of one illustrative routine disclosed herein for optimizing chunks stored in a distributed object store that contain objects from a directed acyclic graph, such as a version control graph, according to embodiments described herein.

FIG. 7 is a flow diagram showing a routine 700 that illustrates aspects of one mechanism disclosed herein for optimizing the contents of chunks 112 stored in a distributed object store 116 that contain objects from a directed acyclic graph, such as a version control graph 106, according to embodiments described herein. The routine 700 begins at operation 702, where the repository storage service 110 generates or obtains a list of all of the version control objects 108 that are stored in chunks 112 in the distributed object store 116 for the version control graph 106. In one embodiment, the repository storage service 110 continually maintains a list of stored chunks 112.

The routine 700 then proceeds from operation 702 to operation 704, where the repository storage service 110 traverses the version control graph 106 and marks all of the version control objects 108 in the list that are needed (i.e. referenced by) the version control graph 106. In this way, a list is generated that identifies the version control objects 108 that are stored in chunks 112 in the distributed object store 116 but that are not referenced by the version control graph 106. It should be appreciated that other mechanisms might be utilized to generate this list in other embodiments.

From operation 704, the routine 700 proceeds to operation 706, where the repository storage service 110 initializes a variable to keep track of a current chunk 112 in the distributed object store 116 that is being optimized. The current chunk is initially set to a first of the chunks 112 stored in the distributed object store 116. Once the variable has been initialized, the routine 700 proceeds from operation 706 to operation 708.

At operation 708, the repository storage service 110 utilizes the list generated at operations 702 and 704 to determine whether the current chunk 112 being evaluated includes any unneeded version control objects 108. If the current chunk 112 does not include any unneeded objects 108, the current chunk 112 does not need to be optimized. Accordingly, in this case, the routine 700 proceeds from operation 708 to operation 710, where the repository storage service 110 determines whether any additional chunks 112 remain to be processed.

If additional chunks 112 remain to be processed, the routine 700 proceeds from operation 710 to operation 712, where the variable utilized to keep track of the current chunk 112 is modified to point to the next chunk 112 to be evaluated. The routine 700 then proceeds from operation 712 to operation 708, described above. If no additional chunks 112 remain to be evaluated, the routine 700 proceeds from operation 710 to operation 724, where it ends.

If, at operation 708, the repository storage service 110 determines that the current chunk 112 includes at least one unneeded object 112, the routine 700 proceeds from operation 708 to operation 714. At operation 714, the repository storage service 110 determines whether the current chunk 112 includes any objects 108 that are needed by the version control graph 106. If the current chunk 112 includes only objects 112 that are not needed by the version control graph 106, then the current chunk 112 can be deleted. Accordingly, if the current chunk 112 does not include any needed objects 108, the routine 700 branches from operation 714 to operation 716, where the current chunk 112 is deleted from the distributed object store 116. The chunk index 120 may also be updated to remove index entries for any deleted objects 108. The routine 700 then proceeds from operation 716 to operation 710 where more chunks 112, if any, may be processed in the manner described above.

If, at operation 714, the repository storage service 110 determines that the current chunk 112 includes at least one needed object 112, the routine 700 proceeds from operation 714 to operation 718. At operation 718, the repository storage service 110 creates a new chunk 112 and stores the needed objects 108 from the current chunk 112 in the new chunk. The new chunk 112 is then stored in the distributed object store 116. Once the new chunk 112 has been stored, the routine 700 proceeds from operation 718 to operation 720, where the index entries for the objects 108 in the newly stored chunk 112 are updated to reflect the new location of these objects 108. It should be appreciated that operations 718, 720 and 722 are only performed in one embodiment if the size of the unneeded objects 108 in a chunk 112 exceeds a particular size threshold. In this way, chunks 112 are only optimized when doing so would result in a meaningful reduction in the size of a chunk.

From operation 720, the routine 700 proceeds to operation 722, where the repository storage service 110 deletes the current chunk 112 from the distributed object store 116. In this way, a new chunk 112 is created and stored that includes only objects 108 that are needed by the version control graph 106, and the chunk 112 containing the unneeded objects 108 is deleted. The routine 700 then proceeds from operation 722 to operation 710, described above, where additional chunks 112 may be optimized in a similar fashion.

It should be appreciated that the optimization mechanism shown in FIG. 7 is merely illustrative and that chunks 112 stored in the distributed object store 116 may be optimized in other ways. For example, and without limitation, objects 108 may initially be stored in chunks 112 in the order that they are received from the VCS client 102. At a later point in time, the chunks 112 may be reorganized using one of the relatedness heuristics described above. A mechanism similar to that shown in FIG. 7 may be utilized to reorganize the chunks 112 utilizing a different heuristic. The chunks 112 might be reorganized again at one or more even later points in time utilizing the same or another heuristic. Other optimizations mechanisms might also be utilized.

It should be appreciated that a reorganization of stored chunks 112 utilizing a different heuristic might be triggered based upon various types of events, such as efficiency of the objects stored in the chunks falling below a predefined threshold. For example, and without limitation, data might be maintained indicating the number of retrieved objects that are actually utilized during traversal and/or retrieval of the version control graph 106. If the percentage of used objects falls below a certain threshold, then the chunks 112 might be reorganized using the mechanism shown in FIG. 7 or utilizing a different heuristic than that utilized to initially store the chunks 112. Other stimuli might also be utilized to trigger the optimization of the chunks 112 stored in the distributed object store 116.

It should also be appreciated that the embodiments described above have been simplified for discussion purposes and that many more computing systems, software components, networking devices, networks, services, and other components may be utilized to implement the embodiments disclosed herein. Additionally, although certain components and/or services have been described herein as providing certain types of functionality, other components and/or services might be utilized to provide the disclosed functionality in other implementations.

Figure 8:
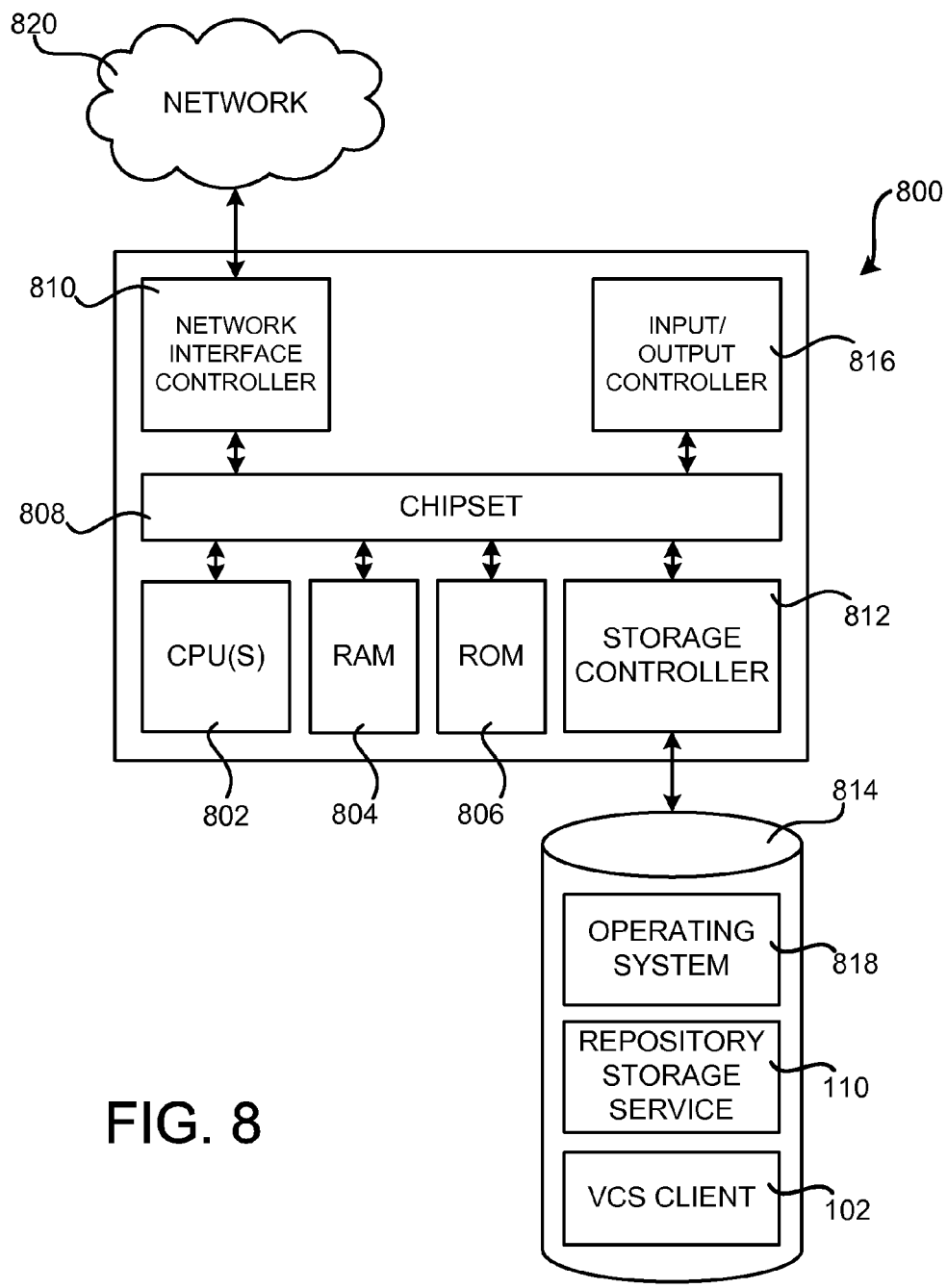
FIG. 8 is a computer architecture diagram showing an illustrative computer hardware architecture for computing devices described in embodiments presented herein.

FIG. 8 shows an example computer architecture for a computer 800 capable of implementing computing systems for providing the functionality described herein. The computer architecture shown in FIG. 8 illustrates a conventional server computer, workstation, desktop computer, laptop, network appliance, tablet computing device, electronic book reader, digital cellular phone, or other computing device, and may be utilized to execute any aspects of the software components presented herein. For example, and without limitation, the computer architecture shown in FIG. 8 might be utilized to implement a computer system for providing the functionality described above as being provided by the VCS client 102, the repository storage service 110, the distributed object storage service 114, and/or the distributed key/value storage service 118. The computer architecture shown in FIG. 8 might also be utilized to implement computer systems that execute software components for providing other types of functionality disclosed herein. Other types of hardware architectures might also be utilized other than the specific hardware architecture shown in FIG. 8.

The computer 800 includes a baseboard, or "motherboard," which is a printed circuit board to which a multitude of components or devices may be connected by way of a system bus or other electrical communication paths. In one illustrative embodiment, one or more central processing units ("CPUs") 802 operate in conjunction with a chipset 808. The CPUs 802 are standard programmable processors that perform arithmetic and logical operations necessary for the operation of the computer 800.

The CPUs 802 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 808 provides an interface between the CPUs 802 and the remainder of the components and devices on the baseboard. The chipset 808 may provide an interface to a random access memory ("RAM") 804, used as the main memory in the computer 800. The chipset 808 may further provide an interface to a computer-readable storage medium such as a read-only memory ("ROM") 806 or non-volatile RAM ("NVRAM") for storing basic routines that help to startup the computer 800 and to transfer information between the various components and devices. The ROM 806 or NVRAM may also store other software components necessary for the operation of the computer 800 in accordance with the embodiments described herein.

According to various embodiments, the computer 800 may operate in a networked environment using logical connections to remote computing devices and computer systems through the network 820, such as a local-area network ("LAN"), a wide-area network ("WAN"), the Internet, or any other networking topology known in the art that connects the computer 800 to remote computers. The chipset 808 includes functionality for providing network connectivity through a network interface controller ("NIC") 810, such as a gigabit Ethernet adapter. The NIC 810 is capable of connecting the computer 800 to other computing devices over the network 820. It should be appreciated that any number of NICs 810 may be present in the computer 800, connecting the computer 800 to various types of networks and remote computer systems.

The computer 800 may be connected to a mass storage device 814 that provides non-volatile storage for the computer 800. The mass storage device 814 may store system programs, application programs, other program modules, and data, which are described in greater detail herein. The mass storage device 814 may be connected to the computer 800 through a storage controller 812 connected to the chipset 808. The mass storage device 814 may consist of one or more physical storage units. The storage controller 812 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 800 may store data on the mass storage device 814 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 814 is characterized as primary or secondary storage, and the like. For example, the computer 800 may store information to the mass storage device 814 by issuing instructions through the storage controller 812 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 814 by detecting the physical states or characteristics of one or more particular locations within the physical storage units.

In addition to the mass storage device 814 described above, the computer 800 may have access to other computer-readable storage media to store and retrieve information, such as program modules, data structures, or other data. It should be appreciated by those skilled in the art that computer-readable storage media can be any available non-transitory media that may be accessed by the computer 800. By way of example, and not limitation, computer-readable storage media may include volatile and non-volatile, removable and non-removable media implemented in any method or technology. Computer-readable storage media includes RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 814 may store an operating system 818 utilized to control the operation of the computer 800. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 814 may store other system or application programs and data utilized by the computer 800, such as the repository storage service 110 and/or the VCS client 102, each of which was described above in detail with regard to FIGS. 1-7. The mass storage device 814 might also store other programs and data not specifically identified herein.

In one embodiment, the mass storage device 814 or other computer-readable storage media may be encoded with computer-executable instructions which, when loaded into the computer 800, may transform the computer from a general-purpose computing system into a special-purpose computer capable of implementing the embodiments described herein. These computer-executable instructions transform the computer 800 by specifying how the CPUs 802 transition between states, as described above. According to one embodiment, the computer 800 may have access to computer-readable storage media, such as an optical disk, a solid-state storage device, or a magnetic storage device, storing computer-executable instructions that, when executed by the computer 800, perform the routines 200, 300, 400, 600 and 700, described above with regard to FIGS. 2, 3, 4, 6 and 7, respectively.

The computer 800 might also include an input/output controller 816 for receiving and processing input from a number of input devices, such as a keyboard, the mouse, a touchpad, a touch screen, an electronic stylus, or other type of input device. Similarly, the input/output controller 816 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that various concepts and technologies for distributed storage and retrieval of directed acyclic graphs, such as a version control graph maintained by a version control system, have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. An apparatus for distributed storage and retrieval of a version control graph comprising one or more nodes having one or more associated version control objects, the apparatus comprising:
a processor; and
a computer-readable storage medium having computer-executable instructions stored thereupon which, when executed by the processor, cause the apparatus to:
store a first set of one or more version control objects of the version control graph, the storing comprising:
receiving the one or more version control objects of the version control graph,
utilizing a relatedness heuristic to group the received one or more version control objects into one or more chunks,
causing the one or more chunks to be stored in a distributed object store, and
creating index entries for the one or more version control objects in a distributed key/value data store, each index entry comprising a unique identifier for a version control object and data identifying a location of the version control object in the distributed object store; and
retrieve a second set of one or more version control objects of the version control graph, the retrieving comprising:
receiving a request for the second set of version control objects in a portion of the version control graph, the request comprising a unique identifier for an entry point version control object in the version control graph;
utilizing the unique identifier for the entry point version control object to retrieve the entry point version control object or a chunk containing the entry point version control object from the distributed object store;
determining that the entry point version control object references other version control objects in the version control graph;
utilizing unique identifiers for the referenced version control objects to retrieve the referenced version control objects or one or more chunks containing the referenced version control objects from one or more of the distributed object store or from a previously retrieved chunk;
retrieving additional referenced version control objects or chunks containing additional referenced version control objects from the distributed object store or a previously retrieved chunk until no additional referenced version control objects remain to be retrieved or a stopping condition has been reached; and
responding to the request for the objects in the portion of the version control graph with the retrieved objects.

2. The apparatus of claim 1, wherein the relatedness heuristic defines related version control objects as version control objects that are of a same type.

3. The apparatus of claim 1, wherein the relatedness heuristic defines related version control objects based upon a distance of the version control objects from one another in the version control graph.

4. The apparatus of claim 1, wherein the computer-readable storage medium has further computer-executable instructions stored thereupon which, when executed by the processor, cause the apparatus to:
traverse the version control graph to identify version control objects that are included in the version control graph; and
delete chunks from the distributed object store that contain only version control objects that are not included in the version control graph.

5. The apparatus of claim 1, wherein the computer-readable storage medium has further computer-executable instructions stored thereupon which, when executed by the processor, cause the apparatus to:
- traverse the version control graph to identify version control objects that are included in the version control graph; and
- for each chunk stored in the distributed object store that contains at least one version control object that is included in the version control graph and at least one version control object that is not included in the version control graph,
  - create a new chunk in the distributed object store containing the at least one version control object in the chunk that is included in the version control graph,
  - create an index entry in the distributed key/value data store for the at least one version control object that is included in the version control graph, and
  - delete the chunk containing the at least one version control object that is not included in the version control graph from the distributed object store.

6. The apparatus of claim 1, wherein the version control objects comprise one or more of objects describing changes, objects describing collections of files, and file version objects.

7. A non-transitory computer-readable storage medium having computer-executable instructions stored thereon which, when executed by a computer, cause the computer to:
- store a distributed object store comprising one or more version control objects grouped into one or more chunks based on a relatedness heuristic;
- store one or more index entries for the one or more version control objects in a distributed key/value data store, each index entry comprising a unique identifier for a version control object and data identifying a location of the version control object in the distributed object store; and
- retrieve a set of version control objects stored in the distributed object store, the retrieving comprising:
  - receiving a request for the set of version control objects, the request comprising a particular unique identifier for an entry point version control object in the distributed object store;
  - utilizing the particular unique identifier for the entry point version control object to retrieve the entry point version control object or a chunk containing the entry point version control object from the distributed object store;
  - determining that the entry point version control object references other version control objects in the version control graph;
  - utilizing other unique identifiers for the referenced version control objects to retrieve the referenced version control objects or one or more chunks containing the referenced version control objects from one or more of the distributed object store or from a previously retrieved chunk;
  - retrieving additional referenced version control objects or chunks containing additional referenced version control objects from the distributed object store or a previously retrieved chunk until no additional referenced version control objects remain to be retrieved or a stopping condition has been reached; and
  - responding to the request for the set of version control objects with the retrieved objects.

8. The non-transitory computer-readable storage medium of claim 7, wherein the distributed object store corresponds to a directed acyclic graph, individual nodes of the directed acyclic graph corresponding to a chunk of the one or more chunks.

9. The non-transitory computer-readable storage medium of claim 7, wherein the relatedness heuristic defines related version control objects as version control objects that are of a same type.

10. The non-transitory computer-readable storage medium of claim 7, wherein the one or more version control objects comprise one or more of objects describing changes, objects describing collections of files, and file version objects.

11. The non-transitory computer-readable storage medium of claim 7, wherein the relatedness heuristic defines related version control objects based upon a distance of the version control objects from one another in a version control graph.

12. The non-transitory computer-readable storage medium of claim 7, wherein the computer-readable storage medium has further computer-executable instructions stored thereupon which, when executed by the processor, cause the apparatus to:
- determine that a particular chunk of the one or more chunks contains only version control object that are not included in a version control graph associated with the distributed object store; and
- delete the particular chunk from the distributed object store.

13. The non-transitory computer-readable storage medium of claim 7, wherein the computer-readable storage medium has further computer-executable instructions stored thereupon which, when executed by the processor, cause the apparatus to:
- determine that a first chunk of the one or more chunks contains at least one version control object that is included in a version control graph associated with the distributed object store and at least one version control object that is not included in the version control graph,
- create a second chunk in the distributed object store containing the at least one version control object in the first chunk that is included in the version control graph, and
- create an index entry in the distributed key/value data store for the at least one version control object that is included in the version control graph.

14. The non-transitory computer-readable storage medium of claim 13, wherein the computer-readable storage medium has further computer-executable instructions stored thereupon which, when executed by the processor, cause the apparatus to delete the first chunk containing the at least one version control object that is not included in the version control graph from the distributed object store.

15. A computer-implemented method for storage and retrieval of objects in nodes of a directed acyclic graph, the method comprising:
- storing a distributed object store comprising one or more version control objects grouped into one or more chunks based on a relatedness heuristic;
- storing one or more index entries for the one or more version control objects in a distributed key/value data store, each index entry comprising a unique identifier for a version control object and data identifying a location of the version control object in the distributed object store; and
- retrieving a set of version control objects stored in the distributed object store, the retrieving comprising:

receiving a request for the set of version control objects, the request comprising a particular unique identifier for an entry point version control object in the distributed object store;

utilizing the particular unique identifier for the entry point version control object to retrieve the entry point version control object or a chunk containing the entry point version control object from the distributed object store;

determining that the entry point version control object references other version control objects in the version control graph;

utilizing other unique identifiers for the referenced version control objects to retrieve the referenced version control objects or one or more chunks containing the referenced version control objects from one or more of the distributed object store or from a previously retrieved chunk;

retrieving additional referenced version control objects or chunks containing additional referenced version control objects from the distributed object store or a previously retrieved chunk until no additional referenced version control objects remain to be retrieved or a stopping condition has been reached; and responding to the request for the set of version control objects with the retrieved objects.

16. The computer-implemented method of claim 15, wherein the distributed object store corresponds to a directed acyclic graph, individual nodes of the directed acyclic graph corresponding to a chunk of the one or more chunks.

17. The computer-implemented method of claim 15, wherein the relatedness heuristic defines related version control objects as version control objects that are of a same type.

18. The computer-implemented method of claim 15, wherein the one or more version control objects comprise one or more of objects describing changes, objects describing collections of files, and file version objects.

19. The computer-implemented method of claim 15, wherein the relatedness heuristic defines related version control objects based upon a distance of the version control objects from one another in a version control graph.

20. The computer-implemented method of claim 15, further comprising:
 determining that a particular chunk of the one or more chunks contains only version control object that are not included in a version control graph associated with the distributed object store; and
 deleting the particular chunk from the distributed object store.

21. The computer-implemented method of claim 15, further comprising:
 determining that a first chunk of the one or more chunks contains at least one version control object that is included in a version control graph associated with the distributed object store and at least one version control object that is not included in the version control graph,
 creating a second chunk in the distributed object store containing the at least one version control object in the first chunk that is included in the version control graph, and
 creating an index entry in the distributed key/value data store for the at least one version control object that is included in the version control graph.

22. The computer-implemented method of claim 15, further comprising deleting the first chunk containing the at least one version control object that is not included in the version control graph from the distributed object store.

* * * * *